(12) United States Patent
Grover

(10) Patent No.: US 6,361,055 B1
(45) Date of Patent: Mar. 26, 2002

(54) CRYOGENIC COMPOSITE TANK SEALS

(75) Inventor: Richard Lloyd Grover, Whittier, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/379,037

(22) Filed: Aug. 23, 1999

(51) Int. Cl.[7] ............................. F16J 15/10; B65D 8/04
(52) U.S. Cl. .................. 277/652; 277/944; 220/560.05; 220/614; 220/622; 220/652; 220/692; 220/901; 220/DIG. 11; 244/131
(58) Field of Search ................................. 277/630, 637, 277/650, 652, 939, 944; 403/286, 293, 296, 341; 220/612, 614, 616, 622, 677, 678, 680, 682, 683, 688, 692, 693, 901, 560.04, 560.05, 560.07, 4.22, 4.23, 611, 652, DIG. 11

(56) References Cited

U.S. PATENT DOCUMENTS

| | | | |
|---|---|---|---|
| 1,066,018 A | * | 7/1913 | Kehoe |
| 1,789,642 A | * | 1/1931 | Wirth |
| 1,955,816 A | * | 4/1934 | Lemont |
| 2,235,937 A | * | 3/1941 | Linberg |
| 2,317,734 A | * | 4/1943 | Cook |
| 2,396,825 A | | 3/1946 | Burroughs |
| 2,710,113 A | * | 6/1955 | Pritchard |
| 2,726,009 A | * | 12/1955 | Murdock, Sr. et al. |
| 2,727,286 A | * | 12/1955 | Moore |
| 2,934,236 A | * | 4/1960 | Groves |
| 2,974,078 A | * | 3/1961 | Petritz et al. |
| 2,981,651 A | | 4/1961 | Arnold |
| 3,068,016 A | | 12/1962 | Dega |
| 3,082,010 A | | 3/1963 | Morley et al. |
| 3,172,252 A | * | 3/1965 | Boek |
| 3,205,052 A | * | 9/1965 | Downing |
| 3,357,594 A | * | 12/1967 | Grosh et al. |
| 3,368,708 A | | 2/1968 | Pflederer |
| 3,420,477 A | * | 1/1969 | Howard |
| 3,589,403 A | * | 6/1971 | Chase .......................... 138/177 |
| 3,645,816 A | * | 2/1972 | Billias et al. .................. 156/94 |
| 3,843,010 A | * | 10/1974 | Morse et al. |
| 3,894,372 A | * | 7/1975 | Roberts et al. ........... 52/223 R |
| 3,922,411 A | * | 11/1975 | Motta et al. ................. 428/116 |
| 3,931,908 A | * | 1/1976 | Cheyney ....................... 220/71 |
| 3,968,022 A | | 7/1976 | Eng et al. |
| 4,050,700 A | | 9/1977 | Lifferth |
| 4,070,221 A | | 1/1978 | Anthony |
| 4,177,308 A | * | 12/1979 | Beeler ......................... 428/117 |
| 4,192,519 A | | 3/1980 | Buggele |
| 4,218,066 A | | 8/1980 | Ackerman |
| 4,296,540 A | | 10/1981 | Potter |
| 4,322,462 A | * | 3/1982 | Lucas .......................... 428/61 |
| 4,360,116 A | * | 11/1982 | Humphrey ................... 220/586 |
| 4,369,894 A | * | 1/1983 | Grover et al. |
| 4,552,281 A | * | 11/1985 | Schneider |
| 4,562,934 A | * | 1/1986 | Hammond |
| 4,580,794 A | | 4/1986 | Gibbons |
| 4,584,041 A | * | 4/1986 | Lyman et al. ................ 156/156 |
| 4,653,663 A | | 3/1987 | Holtsclaw |

(List continued on next page.)

Primary Examiner—Anthony Knight
Assistant Examiner—Alison K. Pickard
(74) Attorney, Agent, or Firm—Terry J. Anderson; Karl J. Hoch, Jr.

(57) ABSTRACT

Sealed structural joints for use in manufacturing pressurized tank structures, and particularly cryogenic fuel tanks. In a preferred embodiment, the structural joints and seals comprise a strain-compliant material as applied to a joint or seam to provide a surface to bridge the joint with a continuous skin so as to provide a completed bonded inner surface. In the preferred embodiment, the strain-compliant material comprises honeycomb, although foam cores and homogenous elastomeric materials may also be utilized. Among the specific applications by which the joint seals of the present invention may be employed include splice joint seals, frame seals, and access cover openings.

7 Claims, 2 Drawing Sheets

U.S. PATENT DOCUMENTS

| | | | | |
|---|---|---|---|---|
| 4,735,835 A | * | 4/1988 | Taira et al. | 428/35 |
| 4,836,030 A | * | 6/1989 | Martin | 73/800 |
| 4,865,220 A | * | 9/1989 | Wiegand | 220/567.1 |
| 4,867,338 A | | 9/1989 | Bingham | |
| 4,892,321 A | | 1/1990 | Colgate et al. | |
| 5,133,475 A | | 7/1992 | Sharp | |
| 5,175,665 A | * | 12/1992 | Pegg | 361/218 |
| 5,251,849 A | * | 10/1993 | Torres | 244/117 R |
| 5,397,020 A | * | 3/1995 | Witt | 220/195.06 |
| 5,456,426 A | * | 10/1995 | Wexler | 244/127 |
| 5,595,321 A | | 1/1997 | Berglund | |
| 6,126,030 A | * | 10/2000 | Kamiyama et al. | 220/484 |

* cited by examiner

CRYOGENIC COMPOSITE TANK SEALS

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

Currently, substantial efforts are being made in the aerospace industry to develop reusable launch vehicles (RLVs) insofar as the same are believed to be the next generation of space vehicles for deploying space exploration payloads into the next century. Ideally, such RLVs will be single-stage-to-orbit vehicles that are intended to be cheaper and easier to operate than current space vehicles.

One key factor that necessarily must be addressed in the development of such RLVs is weight reduction of the spacecraft. In this respect, it is recognized that reducing weight is a key factor in launching a payload into orbit, especially via a single-stage rocket.

Among the materials ideally suited for such applications comprise certain composite materials, and in particular composite materials formed from organic matrix materials and various filaments to form strong structures. Not only are such materials exceptionally lighter than other materials typically deployed in such applications, such as aluminum, but further have been shown to withstand the combined thermal and mechanical loads experienced by spacecraft during launch, orbit and reentry.

Such composite materials are further particularly well-suited for use in the construction of cryogenic fuel tanks that will necessarily be utilized as part of such RLVs. However, the fabrication of such cryogenic fuel tanks from such composite materials is problematic insofar as tanks constructed according to conventional manufacturing techniques fail to successfully survive flight operating conditions. In particular, such tanks are prone to fail at specific joints and seams formed therein at the juncture between the various composite skin components utilized to fabricate such tanks. In this regard, there have yet to be developed structural joints and seals for use in such tank structures that enable such structures to retain the structural durability necessary to withstand the thermal and mechanical loads encountered during space flight while at the same time minimizing weight attributable thereto and providing the necessary sealing. Indeed, permeability of composite materials has been a concern for engineers for some time, particularly with respect to the possibility that such materials can leak hydrogen.

Accordingly, there is a substantial need in the art for improved structural joints and seals for use in pressurized tank structures, and in particular cryogenic fuel tanks, that enable such tanks to be fabricated from such lightweight composite materials but yet possess the structural curability to enable the same to be repeatedly utilized in space flight. There is additionally a need in the art for structural joints and seals that, in addition to minimizing weight, are of simple construction and may be readily and easily deployed for use in a variety of applications. Still further, there is a need for structural joints and seals that can be utilized in any of a variety of applications specific to tank structures, and in particular, splice joint seals, frame seals and access cover openings.

BRIEF SUMMARY OF THE INVENTION

The present invention specifically addresses and alleviates the above-identified deficiencies in the art. In this regard, the present invention is directed to novel structural joints and seals for use in pressurized structures, and in particular cryogenic fuel tanks formed from composite materials. According to a preferred embodiment, the structural joints and seals comprise a strain-compliant material as applied to a joint or seam to thus provide a surface to bridge such joint or seam with a continuous component skin to thus produce a completely bonded inner surface. The strain-compliant materials are further shaped to resist shear and peel stresses, as well as serve to act as a redundant leak barrier. Preferably, the strain-compliant material consists of reinforced plastic or metallic honeycomb, although foam core and homogeneous elastomeric materials may be utilized in certain applications.

Among the specific applications by which the structural joints and seals of the present application may be utilized are in connection with structural joints, namely, splice joint seals, frame seals and access cover openings of pressurized tank structures. In this respect, the structural joints and seals of the present invention permit construction of tanks from component skin and internal structural details using conventional aircraft joint construction techniques. It is further believed that such structural joints and seals are particularly well-suited for cryogenic fuel tanks, in addition to conventional non-cryogenic tanks containing liquids and gases.

It is therefore an object of the present invention to provide structural joints and seams and methods of fabricating the same that are useful in the manufacture of tanks for containing pressurized gases and liquids as formed from component skin that are exceptionally durable and can be utilized to seal joints and seams in a more durable and reliable manner than prior art devices and techniques.

Another object of the present invention is to provide structural joints and seams and methods of fabricating the same that serve to form a redundant leak barrier about a joint or seam as formed within a tank for receiving, holding and controllably releasing pressurized fluid and/or gas.

Another object of the present invention is to provide structural joints and seams and methods of fabricating the same that permit the construction of tanks for holding pressurized liquids and/or gases, and in particular cryogenic fuel tanks, from component skin using conventional aircraft joint construction techniques.

Still further objects of the present invention are to provide structural joints and seams and methods of fabricating the same that can be easily and readily fabricated from existing, commercially-available materials, can be utilized to form tanks that are exceptionally reliable, allows for the fabrication of cryogenic fuel tanks from composite skin materials that further enables such fuel tanks to be lighter weight but of equal or greater durability than prior art tanks, and may likewise be utilized for virtually all conventional, non-cryogenic tanks containing pressurized liquids and gases.

BRIEF DESCRIPTION OF THE DRAWINGS

These as well as other features of the present invention will become more apparent upon reference to the drawings wherein.

DETAILED DESCRIPTION OF THE INVENTION

The detailed description as set forth below in connection with the appended drawings is intended as a description of the presently preferred embodiments of the invention, and is not intended to represent the only form in which the present invention may be constructed or utilized. The description sets forth the functions and sequences of steps for constructing and operating the invention in connection with the illustrated embodiments. It is understood, however, that the same or equivalent functions and sequences may be accomplished by different embodiments and that they are also intended to be encompassed within the scope of this invention.

Figure 1:
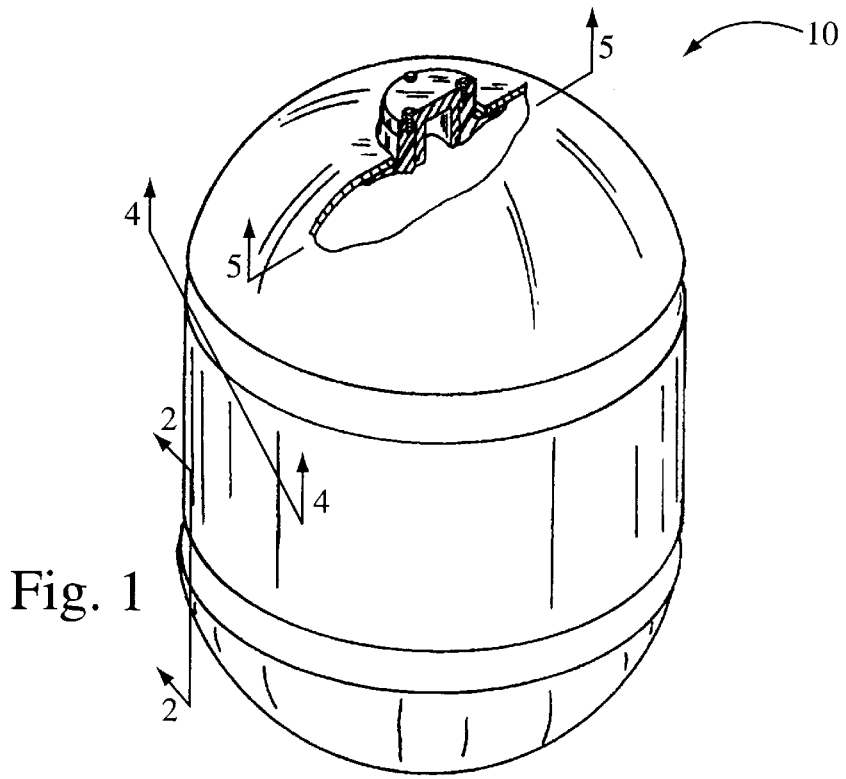
FIG. 1 is an elevational, perspective view of a tank member for receiving, holding and controllably releasing pressurized substances.

The present invention comprises sealed structural joints that are useful in manufacturing cryogenic fuel tanks, such as is depicted in FIG. 1, that utilize a strain-compliant material to form a smooth internal surface for lay-up and cure of a co-cured internal skin or bonding of a pre-cured internal skin spanning such joint. In this regard, the internal skin provides the leak barrier and the strain-compliant material provides the bonding surface. The concept permits construction of a tank from component skin and internal structural details using conventional aircraft joint construction techniques.

As to the foregoing, the strain-compliant material is the essential component. In this respect, the strain-compliant material provides a surface to bridge the joint with a continuous skin, providing a completely bonded inner surface. The strain-compliant material permits the designer to control the bond stresses at insignificant levels while also providing a redundant leak barrier. The strain compliance at all operational temperatures is necessary for compatibility with the large strains and deformations in the mechanical joint. To that end, honeycomb is believed to be a particularly attractive material since it can accommodate large deformations without developing high bond shear and peal stresses. Also, metallic honeycomb provides a redundant barrier to leakage from the edges of internal skin so that the internal skin does not have to be bonded to the external skin around the edges of the core.

It should further be recognized, however, that foam cores are also potential strain-compliant materials as long as they have adequate properties in the operational temperature range. Homogeneous elastomeric materials are also candidates but these materials become stiff and brittle at cryogenic temperatures and cannot accommodate the high joint strains. Such materials are also dense and have a high weight penalty.

Figure 2:
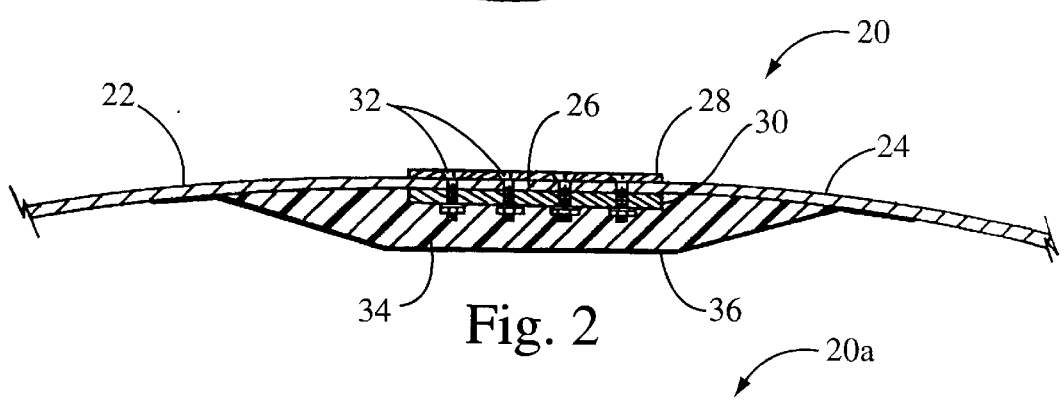
FIG. 2 is a partial cross-section view taken along line 2—2 of FIG. 1 depicting a splice joint seal formed in accordance with a preferred embodiment of the present invention.
Figure 3:
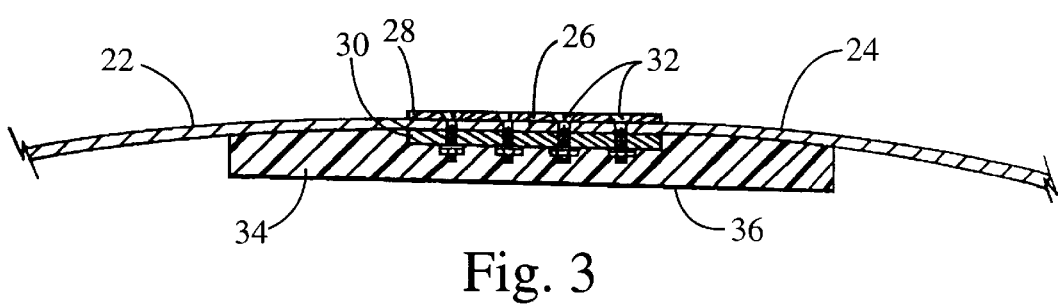
FIG. 3 is a second partial cross-sectional view taken along line 2—2 of FIG. 1 depicting a second preferred splice joint seal.
Figure 4:
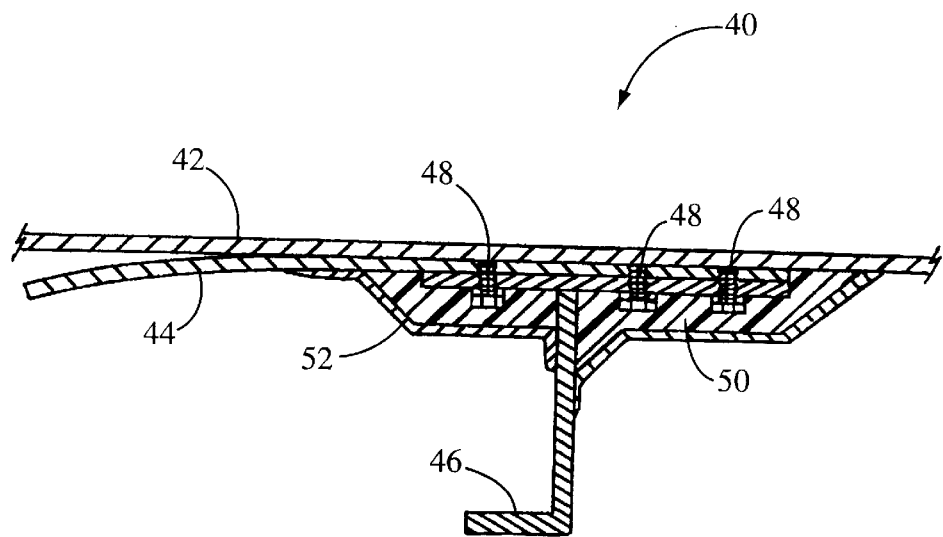
FIG. 4 is a cross-sectional view taken along line 4—4 of FIG. 1 depicting a frame seal constructed in accordance to preferred embodiment of the present invention.
Figure 5:
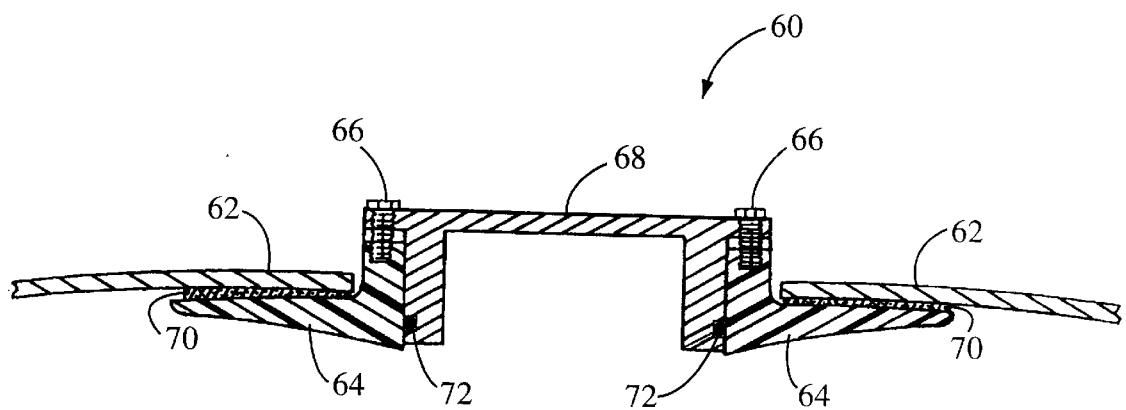
FIG. 5 is a cross-sectional view taken along line 5—5 of FIG. 1 depicting an access cover opening constructed in accordance to a preferred embodiment of the present invention.

Three example applications of the concept are described: (1) splice joint seal(s) as depicted in FIGS. 2 and 3; (2) frame seal(s) as depicted in FIG. 4; and (3) access cover opening(s) as depicted in FIG. 5.

When applied to a splice joint seal 20, as shown in FIG. 2, the present invention allows a pressure vessel to be constructed by connecting multiple shell components 22, 24 using conventional bolted joint technology. The skins 22, 24 are joined at junction 26 by double or single shear splice plates 28, 30 by fasteners 32. Advantageously, no joint sealant is required.

As illustrated, the joint is sealed by bonding the strain-compliant material 34 over the juncture of joint 26 to form the bond surface for the internal skin 36. The internal skin 36 is the pressure barrier. The skin 36 can be directly bonded around the edges as shown in FIG. 2 or terminated on the strain-compliant material as shown in FIG. 3. In the latter case, the primary leak path is through the strain-compliant material 34 (so the material must be non-porous in that direction). In the former case, the primary leak path is the bond between the internal skin 36 and the primary skin or skins 22, 24 and the strain-compliant material 34 becomes a redundant pressure barrier.

The unique component of this design is the strain-compliant layer 34. As will be recognized, the bolted joint, as formed by the cooperation of fasteners 32 with splice plates 28, 30, is structurally highly reliable but difficult to seal using conventional methods. Alternate bonded joints are leak-proof but very difficult to manufacture on a large scale, and structurally at a high risk. Advantageously, the seal design of the present invention permits assembly by using bolted joints followed by strain-compliant material 34 and internal skin 36 application. As is known, double fastener rows of tightly spaced fasteners are always required for conventional joints using tank sealant. In the present design, however, a single row can be used if structurally acceptable. The strain-compliant material 34 isolates the skin 36 from the joint loads allowing for an unloaded, reliable bond. As will be appreciated, relatively loose manufacturing tolerances are required for this concept.

As applied to frame seals, such as 40 depicted in FIG. 4, the present invention allows a complex joint, composed of spliced skins 42, 44 and internal members, such as a frame 46, to be constructed using conventional bolted joint technology without regard for sealing the joint. The joint is sealed after assembly by bonding strain-compliant material 50 over bolts 48 and co-curing the continuous internal skin 52 on the strain-compliant material 50 and transitioning to the skins 42, 48 extending from the opposite sides thereof. The strain-compliant material 50 may be round or square at the frame, depending on manufacturing and stress requirements. It will further be recognized that the strain-compliant material 50 on the frame can be bonded before assembly and drilled and counter-bored along with the skins and frame during assembly.

As in the aforementioned embodiment, the unique component of this design is the strain-compliant material 50. In addition, it permits the fabrication of unlimited size tanks since there is no restriction imposed by autoclave size. As will be recognized, the transition from the strain-compliant material 50 to the skin 52 would be designed to keep the shear and peel stress between the internal 44 and external 42 skins at insignificant levels. The number of bolt rows and fastener pitch would accordingly be dictated by structural requirements, rather than sealing requirements as in conventional joints using tank sealant. Since the leak path is through the edge bonds between the internal 44 and external skins 42, the strain compliant material 50 thus serves as a redundant leak barrier.

Referring now to FIG. 5, there is depicted an access opening 60 which uses conventional metallic sealing technology for covers that need to be removed during the service life of the vessel. A standard cover plate 68 is bolted to a boss plate 64 with bolts 66. The seal between the cover plate 68 and boss plate 64 can be accomplished by various mechanical cryogenic sealing techniques such as spring-loaded Teflon cup seals of cryogenic face gaskets shown as 72.

The boss plate 64 is connected to the composite shell 62 by a continuous sheet of strain-compliant material 70 using conventional film adhesives. Aluminum honeycomb is particularly attractive for this joint since it can be fabricated from a single piece without splices. The boss plate flange seals the cells and the honeycomb itself prevent leakage parallel to the bonded surfaces.

The strain-compliant honeycomb layer 70 provides the unique component of this design. The honeycomb surfaces are bonded to the two components 64 and 62 so the only leak path is through the bonded core nodes. These nodes will be subjected to low stresses and should be reliable. Also, the core will limit the shear stress in the film adhesive to safe levels for cryogenic applications. As will be recognized, without the strain-compliant shear layer 70, in this case honeycomb, the adhesive bond would not be sufficiently reliable for cryogenic applications.

Although the invention has been described herein with specific reference to a presently preferred embodiment thereof, it will be appreciated by those skilled in the art that various modifications, deletions, and alterations may be made to such preferred embodiment without departing from the spirit and scope of the invention. In this regard, it will be recognized that the concepts of the present application are applicable to conventional non-cryogenic tanks containing liquids or gases as well as pressurized crew compartments or cargo containers. Accordingly, it is intended that all reasonably foreseeable additions, modifications, deletions and alterations be included within the scope of the invention as defined in the following claims.

What is claimed is:

1. A pressure-container vessel, comprising:
   a) at least one first skin component;
   b) at least one second skin component;
   c) at least one fastener member for securing said at least one first skin component to said at least one second skin component such that said components are rigidly held in adjacency to define a vessel having an internal surface, said internal surface having a joint formed by said adjacent skin components; and
   d) a strain-compliant material bonded to said joint and the interior surface of said vessel.

2. The container of claim 1 wherein said strain-compliant material is further formed over said at least one fastener mechanism.

3. The container of claim 1 wherein said strain-compliant material comprises honeycomb.

4. The container of claim 1 wherein said strain-compliant material comprises metallic honeycomb.

5. The container of claim 1 wherein said adjacent first and second skin components and strain-compliant material cooperate to define a continuous internal surface upon the interior surface of said vessel.

6. The container of claim 1 wherein said first and second skin components comprise composite skin components.

7. The container of claim 1 wherein said container comprises a cryogenic fuel tank.

* * * * *